Figure 1:
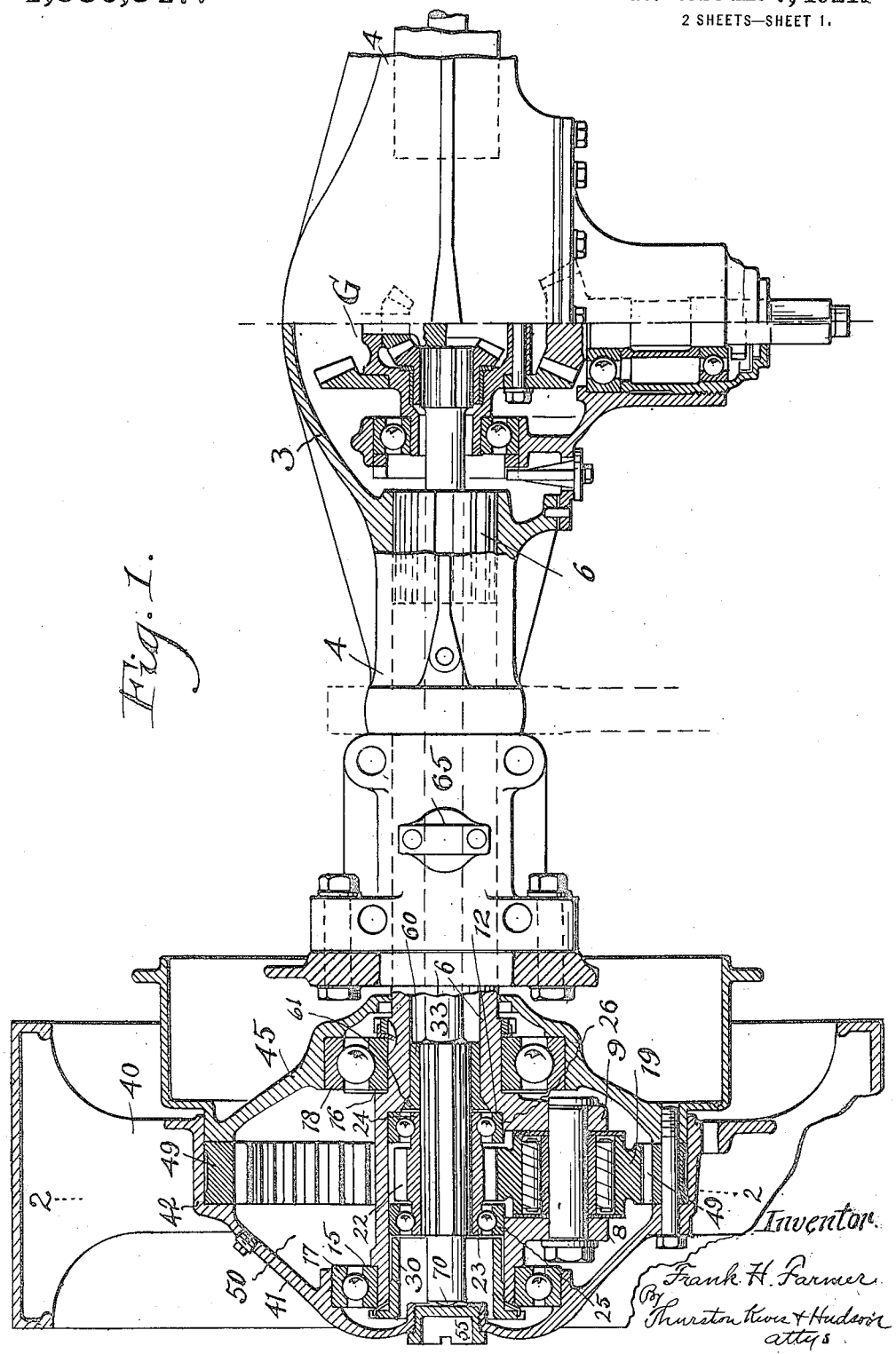

F. H. FARMER.
INTERNAL DRIVE REAR AXLE.
APPLICATION FILED MAR. 11, 1919.

1,380,547.

Patented June 7, 1921.
2 SHEETS—SHEET 1.

Inventor
Frank H. Farmer
By Thurston Kwis & Hudson
attys

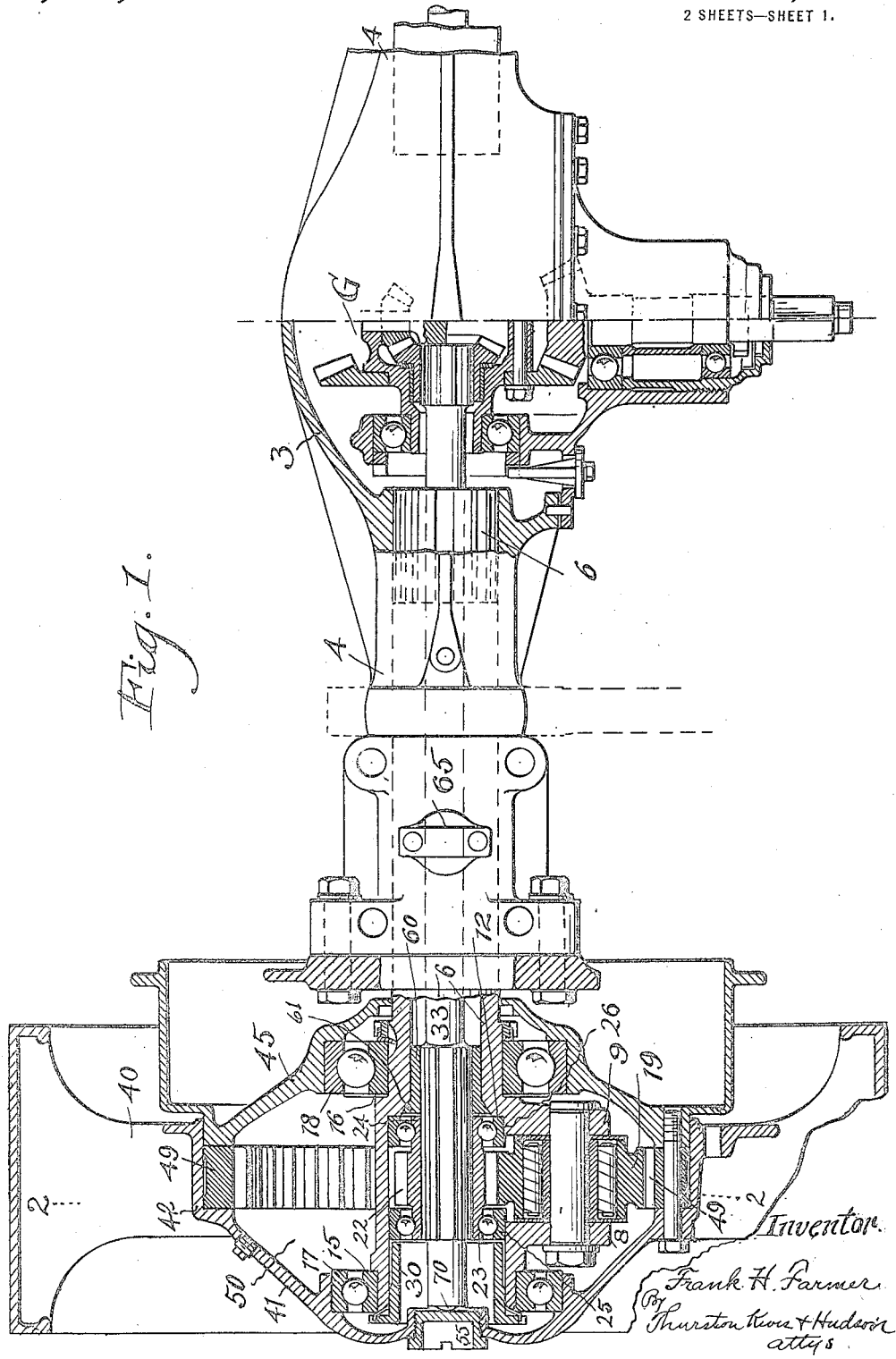

UNITED STATES PATENT OFFICE.

FRANK H. FARMER, OF CLEVELAND, OHIO, ASSIGNOR TO THE WHITE MOTOR COMPANY, OF CLEVELAND, OHIO, A CORPORATION OF OHIO.

INTERNAL-DRIVE REAR AXLE.

1,380,547.   Specification of Letters Patent.   Patented June 7, 1921.

Application filed March 11, 1919. Serial No. 281,983.

*To all whom it may concern:*

Be it known that I, FRANK H. FARMER, a citizen of the United States, residing at Cleveland, in the county of Cuyahoga and State of Ohio, have invented a certain new and useful Improvement in Internal-Drive Rear Axles, of which the following is a full, clear, and exact description.

This invention is an improvement in the kind of internal drive rear axles shown and described in my prior application, Serial No. 218,713.

The object of this invention, speaking generally, is to correct certain minor defects which were found to exist in the structure disclosed in said prior application.

In particular, the axle in which the present invention is embodied, is an improvement upon the prior structure referred to, because the parts thereof are so constructed that they may be accurately assembled in proper working relations more quickly and more easily and with greater certainty; because the axle when completed is stronger and less liable to get out of order; and because it is so organized as to insure that the lubricant put into the hollow wheels shall remain therein and keep the inclosed gearings and bearings adequately lubricated.

In the drawing, Figure 1 is a plan view showing for most part in central longitudinal section of rather more than one half a rear axle construction in which the present invention is embodied; Fig. 2 is a side view partly broken away and sectioned in the plane of line 2—2 on Fig. 1; Fig. 3 is a detached view partly sectioned of the gear cage member of the axle; and Fig. 4 is an end view of said gear cage member.

The axle structure includes a hollow axle frame member having an enlarged central portion 3 which serves as a housing in which the differential gearing G is mounted, and two alined axle tubes 4, which extend in opposite directions therefrom. Associated with each axle tube is a tubular gear cage member 6 which telescopes into and fits within the axle tube and is immovably connected therewith. Specifically in the construction shown the member is formed on its inner end with splines and grooves which fit the correspondingly shaped part of the hollow axle structure; and a key 65 which goes through and is fixed to the axle tube enters and fits a hole in the gear cage member. This gear cage member projects axially through the inner side plate 45 of a hollow wheel 40 into the central chamber 50 within said wheel. It supports the inner rings 15 and 16 of the two annular ball bearings which are within the chamber 50, the outer rings 18 of which bearings engage the two side plates 41, 45, of the wheel. This gear cage member is formed within the chamber 50 with two laterally projecting ears 8 and 9 and there is a hole 10 in the wall of the gear cage between these two ears; and an internal shoulder 12 inside this hole.

A tubular pinion 22 is formed with hubs 23, 24, at its ends, which hubs serve as the inner rings of annular ball bearings. The outer rings 25, 26, are supported within the tubular gear cage member. This pinion and the annular ball bearing referred to constitute a unit, the parts of which are assembled outside of the gear cage member. The bore of this gear cage member from its outer end to the shoulder 12 is such that this unit may be slipped into place until the ring 26 is in contact with the shoulder 12. A tubular nut 30 screws into the outer end of the gear cage member against the bearing ring 25, and thereby this pinion unit, that is, pinion and its bearings, are held in position in said gear cage unit.

33 represents one of the axle shafts which at its inner end has a spline and groove engagement with one of the gears of the differential mechanism within the housing 3. It extends out through the hollow gear cage member and through the pinion 22 with which it has a spline and groove engagement.

There is an axial hole through the outer plate 41 of the wheel, large enough for the axle shaft to pass through it. A cap 55 is screwed into this hole to close it. The wheel as shown is substantially like that which is shown and described in my prior application. It comprises the inner dished plate 45, the outer dished plate 41 of which the spokes and rim of the wheel are integral parts. This dished plate 41 has a circumferential flange 42 at its margin, the ring gear 49 fits within said flange, and so does the outer margin of the dished plate 45, and the three parts are then secured together by bolts.

When it is desired wholly or partially to withdraw an axle shaft, it is only necessary to unscrew the cap 55.

When it is desired to disassemble the mechanism within the wheel chamber the outer part of the wheel, including the dished plate 41, the spokes and rim are unbolted from the parts specified to which they are ordinarily bolted and are removed. Then the hollow nut 30 can be taken out; and thereupon the pinion unit may be removed through the outer end of the gear cage unit.

When the parts are assembled a considerable quantity of oil is put into the chamber 50 of the wheel for keeping the gearing and the bearings within the wheel well lubricated. When a motor vehicle having such an axle is in use it runs along on the right side of the road and the road is usually crowned, so that the right end of the axle will be lower than the left end. With the construction shown in said prior application the lubricant shown within the chamber would, before a great while, work its way out through the tubular cage member toward the central housing, and would frequently pass from there over into the wheel chamber to the right hand wheel. At any rate, the wheel chamber of the left hand wheel frequently got dry. To prevent this, the construction shown provides a tubular bushing 60 which embraces and has a splined engagement with the adjacent splined portion of the shaft 33, so that it must rotate with said shaft.

At its outer end this bushing is formed with an outwardly extended flange 61 having a beveled inner face preferably. The outer cylindrical surface of this bushing and this beveled inner face of the flange in its end are formed so as to have a nice sliding engagement against correspondingly shaped parts of the inner surface of the gear cage member. This bushing substantially prevents any flow of oil from the wheel chamber past it and toward the central housing of the axle frame member. This is partly because of the nice sliding fit between its outer surfaces and inner surfaces of the gear cage member. It is also in part due to the presence of the flange 61 on the end of this bushing around which oil must pass as it passes between the bushing and the gear cage member. The oil to reach the end of this bushing has to pass through the annular ball bearing, of which the ring 24 is a part. When the axle 33 and this bushing are rotated the centrifugal force at the outer edge of the flange of said bushing acts to prevent the oil from flowing over said flange and between the flange and bushing and the parts of the gear cage member with which they engage.

Endwise movement outward of the axle shaft 33 is prevented without much friction loss by a ball 70 placed in an axial recess in its end in a position where it may engage with the inner face of the nut 55. Some wear of this nut takes place, but not much. In any event, it is not an expensive proposition to replace the nut 55 by another if this wear has become too great.

Having described my invention, I claim:—

1. In an internal drive rear axle structure having a hollow frame member which is formed with two oppositely extended axle tubes, and, in combination with each of said axle tubes, a tubular gear cage member which telescopes into said axle tube and is immovably connected therewith, a hollow wheel which is rotatably mounted on the projecting outer end of said gear cage member and is provided with an internal ring gear,—which gear cage member, within the wheel, is formed with two laterally extended integral ears, with a hole through its wall between said ears, with an internal shoulder located inside of said hole and with an internal bore whose diameter is as great at all points as it is adjacent said shoulder, a pinion unit comprising a tubular pinion and bearing rings in which said pinion is mounted,—which bearing rings are of such diameter that they may be inserted into said tubular gear cage member through the outer end thereof and which fit within said tubular member with the inner of said bearing rings in engagement with said internal shoulder, a tubular nut which screws into the end of said gear cage member against the outer of the bearing rings of said pinion unit, an idler gear which is rotatably mounted upon said gear cage unit between the two ears thereof and which projects through the hole in said gear cage unit and engages with said pinion and ring gear, and an axle shaft which passes through the tubular gear cage member and pinion and has a driving spline and groove engagement with the pinion and a driving spline and groove engagement with the differential mechanism.

2. In an internal drive rear axle structure having a hollow frame member which is formed with two oppositely extended axle tubes, and, in combination with each of said axle tubes, a tubular gear cage member which telescopes into said axle tube and is immovably connected therewith, a hollow wheel which is rotatably mounted on the projecting outer end of said gear cage member and is provided with an internal ring gear,—which gear cage member, within the wheel, is formed with two laterally extended integral ears, with a hole through its wall between said ears, with an internal shoulder located inside of said hole and with an internal bore whose diameter is as great at all points as it is adjacent said shoulder, a pinion unit comprising a tubular pinion and bearing rings in which said pinion is mounted,—which bearing rings are of such diameter that they may be inserted into said tubular gear cage member through the outer end thereof, and which fit within said tubular member with the inner of said bearing rings in engagement with said internal shoulder, a tubular nut which screws into the end of said gear cage member against the outer of the bearing rings of said pinion unit, an idler gear which is rotatably mounted upon said gear cage unit between the two ears thereof, and which projects through the hole in said gear cage unit and engages with said pinion and ring gear, an axle shaft which passes through the tubular gear cage member and pinion and has a driving spline and groove engagement with the pinion and a driving spline and groove engagement with the differential mechanism, said wheel having an axially disposed hole through its outer side large enough for the axle to pass through, a screw cap for closing the same, and a ball in a recess in the outer end of said shaft for engagement with the inner face of said screw cap.

3. In an internal drive rear axle structure having a hollow frame member which is formed with two oppositely extended axle tubes, and, in combination with each of said axle tubes, a tubular gear cage member which telescopes into said axle tube and is immovably connected therewith, a hollow wheel which is rotatably mounted on the projecting outer end of said gear cage member and is provided with an internal ring gear,—which gear cage member, within the wheel, is formed with two laterally extended integral ears, with a hole through its wall between said ears, with an internal shoulder located inside of said hole and with an internal bore whose diameter is not decreased from the shoulder to the outer end of said member, a pinion unit comprising a tubular pinion and bearing rings in which said pinion is mounted,—which bearing rings are of such diameter that they may be inserted into said tubular gear cage member through the outer end thereof and which fit within said tubular member with the inner of said bearing rings in engagement with said internal shoulder, a tubular nut which screws into the end of said gear cage member against the outer of the bearing rings of said pinion unit, an idler gear which is rotatably mounted upon said gear cage unit between the two ears thereof and which projects through the hole in said gear cage unit and engages with said pinion and ring gear, and an axle shaft which passes through the tubular gear cage member and pinion and has a driving spline and groove engagement with the pinion and a driving spline and groove engagement with the differential mechanism, said wheel having an axially disposed hole through its outer side large enough for the axle to pass through, a screw cap for closing the same, and a ball in a recess in the outer end of said shaft for engagement with the inner face of said screw cap, a bushing having a spline and groove connection with the axle shaft inside of the inner bearing ring for said pinion which bushing is formed on its outer end with an outwardly extended flange and is rotatably fitted within said gear cage member.

4. In an internal drive axle of the character specified, the combination of a tubular pinion, bearing rings within which said pinion is rotatably mounted, and a tubular gear cage member within which said bearing rings are fitted and by which they are supported,—the bore of said gear cage being large enough to permit the pinion and its bearing rings to be introduced through the end thereof to operative positions.

In testimony whereof I hereunto affix my signature.

FRANK H. FARMER.